Dec. 31, 1935.                L. P. STOKER                2,026,197
                             DRAFT REGULATOR
                          Filed Jan. 3, 1933            2 Sheets-Sheet 1

INVENTOR.
Lyman P. Stoker.
BY
Townsend and Loftus.
ATTORNEYS.

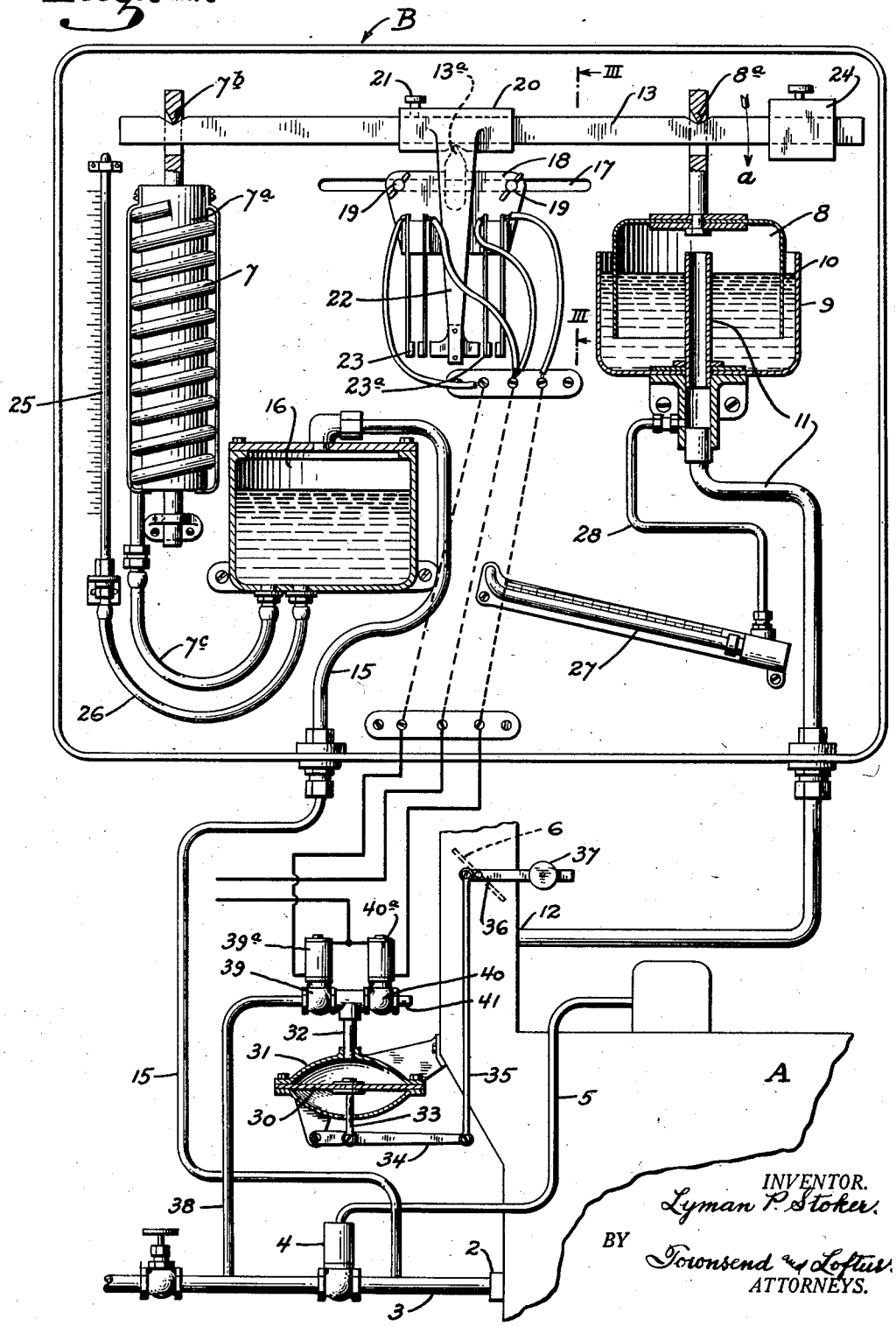

Patented Dec. 31, 1935

2,026,197

UNITED STATES PATENT OFFICE 2,026,197

DRAFT REGULATOR

Lyman P. Stoker, Burlingame, Calif.

Application January 3, 1933, Serial No. 649,803

6 Claims. (Cl. 236—14)

This invention relates to a draft regulator or controlling mechanism whereby a predetermined or fixed ratio of fuel and air may be maintained in a furnace with changes in fuel flow or pressure, and also to a regulator which will automatically compensate for variations in atmospheric pressure.

In the operation of furnaces, whether in a boiler plant or otherwise, it is necessary to maintain a substantially constant ratio between fuel and air under varying load conditions if any degree of efficiency is to be maintained. Insufficient air will cause incomplete combustion, hence waste of fuel; similarly, an excess of air means fuel waste as part of the fuel will merely be utilized to heat the excess air.

Draft regulators of varying types are in more or less common use, whereby a substantially constant ratio of fuel and air may be automatically maintained for a limited number of steps or rates of fuel flow; other types will give "throttling" control of fuel and air but with no definite means for synchronizing the air flow with the fuel flow, necessitating the introduction of complicated linkages in the attempt to acommodate the characteristics of the valve controlling the air flow, which is usually of the "butterfly" type, to that of the fuel valve, which is usually of a different type. No draft regulating mechanism has been devised, as far as I am aware, which will automatically maintain any desired fuel-air ratio over the entire range of capacity of a furnace, this ratio not being the same necessarily over the entire range, and which provides simple means for changing or adjusting this ratio and which also automatically compensates for variations in air flow due to variations in barometric pressure where natural draft is employed. The variations in draft, with the resultant variations in the volume of air passing through a furnace due to changes in atmospheric pressure, has probably not been fully realized but the fact, nevertheless, remains that atmospheric pressure changes may cause the air flow through a furnace to vary as much as eight to ten percent.

The object of the present invention is to generally improve and simplify the construction and operation of draft regulators; to provide a draft regulator whereby any desired ratio between fuel and air may be automatically maintained with changes in fuel flow or pressure; to provide simple means for changing or adjusting this ratio; and further, to provide a regulator which will automatically compensate for variations in atmospheric pressure.

The draft regulator is shown by way of illustration in the accompanying drawings, in which—

Fig. 2 is a diagrammatic side elevation of the controlling mechanism whereby the draft regulator is actuated.

Figure 1:
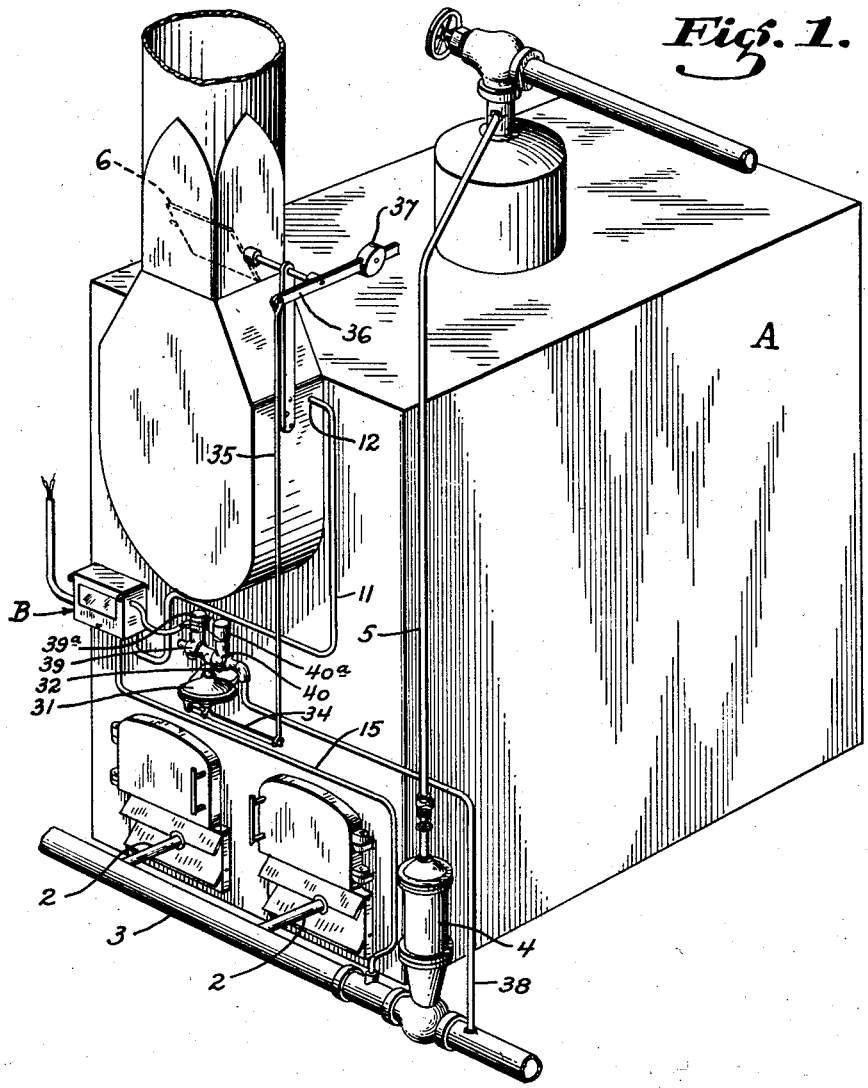
Fig. 1 is a perspective view of a boiler and furnace installation showing the application of the draft regulator.

Referring to the drawings in detail, and particularly Fig. 1, A indicates in general a boiler installation in the lower part of which is a standard form of furnace chamber. A pair of gas burners project into the front end of the furnace, as indicated at 2—2, and these are fed by a supply pipe 3. The quantity of fuel passing through the supply pipe is regulated by a controlling valve of standard construction, generally indicated at 4, and this, in turn, is actuated by the steam pressure in the boiler through means of pipe 5. The regulating valve is of standard construction and it is of the diaphragm type. When the steam pressure decreases, the controlling valve opens and increases the flow of gas to the burners and, conversely, when the steam pressure increases, the diaphragm valve closes proportionately and decreases the flow of gas to the burners. Such a mechanism is common and any detailed description of the construction is thought unnecessary.

In burner installations of this character it is essential that the draft or air flow through the furnace be closely regulated so as to maintain a substantially constant ratio between fuel and air. Attempted control of the draft is common and usually some form of mechanism is employed which automatically opens and closes the stack damper, indicated at 6, as the fuel flow to the burner increases or decreases. In the present instance, a novel form of mechanism is employed, which permits the air flow to be synchronized with the fuel flow, said mechanism being capable of not only maintaining any desired ratio between fuel and air with changes in fuel flow or pressure, but also of compensating for variations in atmospheric pressure.

Figure 3:
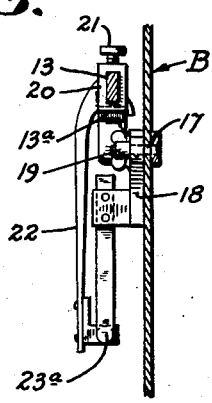
Fig. 3 is a vertical cross section taken on line III—III of Fig. 2.

The mechanism employed is best illustrated in Figs. 2 and 3. It consists of a box or panel B on which is mounted a flexible helical tube 7 and a suction or vacuum actuated bell 8. The bell is of the liquid sealed type as it floats in a cylinder 9 partially filled with a liquid such as indicated at 10. A pipe 11 extends through the bottom of the cylinder and upwardly into the bell and the opposite end of the pipe is connected with the flue chamber of the boiler at the point indicated at 12, see Figs. 1 and 2, or at any other point where it is desirable to control the draft. The vacuum actuated bell 8 actuates one end of a lever, generally indicated at 13, while the flexible helical tube actuates the opposite end of the lever. The flexible helical tube, by the way, is connected through a flexible tube 15 with a mercury well 16 and this is, in turn, connected with the fuel supply, the point of connection being between the controlling valve 4 and the burners 2 so that pressure variations in the supply pipe 3 may be utilized. That is, operation of the valve 4 increases or decreases the flow of gas through the burners by increasing or decreasing the pressure in the supply pipe 3. Such pressure variations cause the mercury to rise and fall in the tube 7, increasing or decreasing the weight thereof, causing rocking of the lever 13 about its pivot 13a in one direction or the other.

The pivot or fulcrum point 13a of lever 13 is adjustable, and this is accomplished as follows: By referring to Fig. 2, it will be noted that the plate or panel B is provided with a slot 17. A bearing bracket 18 engages the front face of the panel and bolts 19 extend through the bracket and through the slots 17. By loosening the bolts the bracket may be moved from one end to the other of the slots 17, and the point 13a is thus moved longitudinally of the lever; the point 13a forming a part of the bracket 18. Surrounding the lever 13 is a sleeve 20, which is freely slidable, but adapted to be secured by a set screw 21. The lower face of the sleeve is provided with a notch to engage the knife edge part of the fulcrum 13a, hence when it is desired to adjust the fulcrum point it is only necessary to release the bolts 19 and the set screw 21. When this is accomplished, the bearing bracket 18, together with the sleeve 20, may be moved longitudinally of the lever and when the desired position is obtained the set screw is tightened and so are the bolts 19. This construction permits application of the instrument to a wide range of fuel pressures to drafts.

The flexible tube 7 connected with the mercury well 16 is coiled about a tube 7a hung by means of a knife edge bail 7b from one end of the lever, the tube 7a merely forming a support for the flexible tube 7 about which it may be helically wound and vertically adjusted, as will hereinafter be described. A similar knife edge bail 8a supports the bell 8 with relation to the opposite end of the lever 13 and a counterweight 24 is employed to provide further adjustments. The sleeve 20 is provided with a downwardly extending arm 22 and the lower end of this arm functions as an actuator for a pair of electrical switches 23 and 24, as will hereinafter be described. At one side of the flexible tube 7 is mounted a gauge glass or tube 25. The lower end of this tube is connected through a flexible tube 26 with the bottom of the mercury well, and will accordingly be graduated to indicate the gas pressure on top of the mercury, or in other words the gas pressure maintained on the burners. A draft gauge is also mounted on the panel B, as indicated at 17, the lower end thereof being connected with a tube 28 and with a pipe 11, which, in turn, is connected with the flue chamber of a furnace. Hence, the draft maintained in the boiler will be visibly indicated on the draft gauge 27, while the pressure of the fuel on the burners will be visibly indicated in the tube 25.

In order that the desired ratio between fuel and air may be maintained, means are provided for automatically rotating the damper 6 about its pivot and a motor or other source of power must be employed to actuate or rotate the damper. In the present instance a diaphragm, such as shown at 30, is employed. The diaphragm is maintained in a housing 31. Gas under pressure is admitted to the housing through a pipe 32, and when gas under pressure is admitted, the diaphragm will flex and the movement of the diaphragm is transmitted through a rod 33 to a lever 32, the movement of the lever being in turn transmitted through a link 35, which is connected to a crank arm 36 on the damper shaft, said crank arm being extended to support a counterweight 37 so that the levers and links employed may be counterbalanced. The fluid under pressure admitted to the housing 31 through pipe 32 may be either gas or liquid and may be obtained from any suitable source. In the present instance the gas fuel employed is used. The gas under pressure is conducted from the main supply pipe through a pipe 38, and this pipe connects with a pair of valves indicated at 39 and 40. Each valve is actuated by a solenoid or similar type of magnet, indicated at 39a and 40a. The magnets will be alternately energized. When magnet 39a is energized, valve 39 will open and gas under pressure supplied by the pipe 38 will thus pass through the valve 39 and pipe 32 into the housing 31. It will here exert a sufficient pressure on the diaphragm 30 to rock the lever 34 in a downward direction, thus closing the damper. When magnet 40a is energized, magnet 39a will be deenergized. Valve 39 will, accordingly, be closed and valve 40 opened, and the gas which was previously admitted under pressure will be permitted to escape or exhaust through pipe 41, said pipe directing the gas to the atmosphere or to the furnace chamber as desired, and when the gas is exhausted the diaphragm will return to normal position due to the action of the counterweight 37, thus opening the damper 6.

The circuits through the respective solenoid magnets 39a and 40a are controlled by the switches 23 and 24, previously referred to, and these in turn are controlled by the arm 22, the arm 22 functioning when the lever 13 swings about its pivot 13a, and a swinging or rocking movement is imparted to the lever end through the increased weight of the flexible tube 7, or the suction exerted within the bell 8. The lever will obviously be actuated by one or the other.

In order to present a clear illustration of the operation of the mechanism and the importance thereof, let it be assumed that under normal atmospheric conditions the draft pull or suction within the furnace box, as indicated by the draft gauge 27, is —.20 inches of water. Under this particular condition of draft with the load on the boiler normal, it will be assumed that the damper is so positioned as to maintain a desired ratio between fuel and air. It will now be assumed that the atmospheric pressure gradually increases. If that happens the draft pull or suction in the stack and furnace will increase, hence a larger volume of air will pass through the furnace and this increase to a larger volume of air will mean an excess of air and a waste of fuel. Such increase in air volume, or in other words in draft, will in the present instance be compensated, as any increase in the suction in the furnace and connected stack with no attendant change in fuel pressure will cause the bell 8 to fall and thereby impart a rocking movement to the lever 13 in the direction of arrow *a*, see Fig. 2, and as the lever 13 rocks in this direction arm 22 will also rock and switch 23 will close. A circuit will thus be closed through the magnet 39*a* causing valve 39 to open. Gas under pressure will thus be admitted to the housing 31 and the diaphragm will move to close the damper. The moment the presure in the flue chamber reaches —.20 inches of water, further movement of the bell 8 and the connected lever 13 will cease. The bell and lever 30 will rise or return to normal position and the circuit through the magnet will be automatically broken, the result being that the damper has been actuated solely by the change in atmospheric pressure and has compensated for such increase in pressure and has thus brought about a fixed or predetermined ratio between the fuel and air. On the other hand, if the atmospheric pressure should become lower the volume of air passing through the furnace would decrease and combustion would be incomplete, but such decrease in volume will be compensated in the present instance, as the draft pull or suction in the stack and combustion chamber will become lower, hence causing the bell 8 to raise and impart movement to the lever 13 in a direction opposite to that indicated by arrow *a*. This will cause switch 24 to close and a circuit will accordingly be closed through the magnet 40*a*, thereby opening valve 40 and permitting exhaust of the gas previously admitted. The diaphragm will thus reverse its movement and the damper will turn to increase the air flow through the stack and furnace. Any changes in draft caused by changes in atmospheric pressure will thus automatically compensate and a substantial predetermined ratio between air and fuel may be maintained under all atmospheric conditions.

The apparatus also automatically adjusts the draft for changes in fuel flow; for instance if the steam pressure increases the controlling valve 4 will automatically act to partially close the flow of gas to the supply pipe 3. The volume of gas delivered to the burners will accordingly be decreased and pressure will also drop in the supply pipe 3, and as this is directly connected with the mercury well 16 through pipe 15 the mercury level in the tube 7 will drop. The weight on the end of the lever, indicated at 7*b*, is thereby decreased and the lever will again swing about its fulcrum 13*a* in the direction of arrow *a*, such movement will cause arm 22 to close switch 23 thereby energizing magnet 39*a* and causing the same to open valve 39. The opening of valve 39 causes partial closing of the damper, hence as the volume of gas delivered to the burner decreases the damper will proportionately turn toward closed position and reduce the volume of air passing through the furnace. Conversely, if the gas pressure in the supply pipe increases, the pressure on the mercury in the well 16 will increase, causing the mercury to rise in the tube 7, thereby increasing the weight on the end 7*b* of the lever. The movement of the lever is thereby reversed, causing switch 24 to be closed, magnet 40*a* will be energized, and valve 40 opened, causing reverse movement of the diaphragm and a partial opening movement of the damper, and the result is that a greater volume of air will pass through the furnace.

The original adjustment and setting of the instrument is accomplished by manually adjusting the pitch of the flexible helical tube so that the weight on that end of the balance lever is just sufficient to require the desired suction or draft under the inverted bell to balance it, since the damper will be stationary only when the lever is in balance. For example, suppose the instrument is on a boiler which, at one pound gas pressure, requires .10 inch water draft. The gas burner pressure of one pound raises the mercury in the helical tube approximately two inches above the zero level, and with the instrument in operation it is simply a matter of adjusting the number of turns of tube included in this two inches until the draft gauge reads .10 inches, when the instrument will automatically stop the damper from further movement. It can be readily seen that when this point is once fixed that any change in pitch of the tube above or below this point has no effect on the adjustment for this point as it does not change the weight on the lever. This adjustment for each point over the entire range can be made independently without interfering with the adjustment at any other point. Hence, means have been provided for automatically opening and closing the damper in order to adjust the draft and hence the air flow to any predetermined quantity for any given fuel rate, and means have also been provided for readjusting the positioning of the damper as atmospheric pressure conditions vary.

Having thus described my invention what I claim and desire to secure by Letters Patent is—

1. In combination with a furnace having a fuel burner a fuel supply pipe and means for varying the pressure of the fuel passing through the pipe and burner, of a draft regulator to control the flow of air through the furnace, a pivotally mounted lever, a vertically disposed helically wound tube suspended from one end of the lever, a mercury well, a flexible tube connecting the lower end of the helical tube with the mercury well, means actuated by pressure changes on the fuel delivered to the burner for changing the mercury level in the well and in the helical tube connected therewith, said changes in mercury level in the helical tube changing the weight imposed on the lever and causing a rocking movement to be imparted to the lever, and means actuated by the rocking movement of the lever for transmitting a closing movement to the damper when the pressure on the fuel decreases and for transmitting an opening movement to the damper when the fuel pressure increases.

2. In combination with a furnace having a fuel burner, a fuel supply pipe and means for varying the pressure of the fuel passing through the pipe and burner, of a draft regulator to control the flow of air through the furnace, a pivotally mounted lever, a vertically disposed helically wound tube suspended from one end of the lever, a mercury well, a flexible tube connecting the lower end of the helical tube with the mercury well, means actuated by pressure changes on the fuel delivered to the burner for changing the mercury level in the well and in the helical tube connected therewith, said changes in mercury level in the helical tube changing the weight imposed on the lever and causing a rocking movement to be imparted to the lever, means actuated by the rocking movement of the lever for transmitting a closing movement to the damper when the pressure on the fuel decreases and for transmitting an opening movement to the damper when the fuel pressure increases, said helically wound tube being constructed of a flexible material to permit the spacings between the coils of the helically wound tube to be increased or decreased.

3. In combination with a furnace having a fuel burner, a fuel supply pipe and means for varying the pressure on the fuel passing through the supply pipe and burner, of a draft regulator to control the flow of air through the furnace, means actuated by pressure variations of the fuel for affecting movement of said draft regulator, and means actuated by draft pressure in the furnace for maintaining in cooperation with said pressure actuated means, a constant ratio of air and fuel throughout the complete range of operation of the furnace, said pressure actuated means including adjustable means to bring about an automatic variation in the ratio of air and gas at one or more predetermined points in the range of operation of the furnace.

4. In combination with a furnace having a fuel burner, a fuel supply pipe and means for varying the pressure on the fuel passing through the supply pipe and burner, of a draft regulator to control the flow of air through the furnace, means actuated by pressure variations of the fuel for affecting movement of said draft regulator, and means actuated by draft pressure in the furnace for maintaining in cooperation with said pressure actuated means, a constant ratio of air and fuel throughout the complete range of operation of the furnace, said pressure actuated means including a pre-set manually adjustable element to automatically bring about a variation in the ratio of air and gas at one or more predetermined points in the range of operation of the furnace.

5. In combination with a furnace having a fuel burner, a fuel supply pipe and means for varying the pressure of the fuel passing through the pipe and burner, of a draft regulator to control the flow of air through the furnace, a pivotally mounted lever, means actuated by rocking movement of said lever for transmitting a closing movement to the damper when the pressure on the fuel decreases and for transmitting an opening movement to the damper when the fuel pressure increases, a member suspended from said lever, a mercury column, a vertically disposed helically wound tube receiving a portion of said mercury column and controlling the effective weight of said suspended member by the height of the mercury level in said tube, and means actuated by pressure changes in the fuel delivered to the burner for changing the mercury level of the said column, the convolutions of said helical tube being freely adjustable relative to one another to vary the extent of rise of mercury therein under various pressures on the column.

6. In an automatic control for the draft regulator of a fuel burning furnace, fuel pressure actuating means, a mercury column subjected to the fuel pressure, and draft regulator actuating means controlled by the mercury column including an upright helical tube into which the mercury column is projected to a point governed by said fuel pressure, the convolutions of said tube being manually adjustable relative to one another to vary the control effect of the mercury column at various fuel pressures.

LYMAN P. STOKER.